Patented Aug. 27, 1935

2,012,820

UNITED STATES PATENT OFFICE 2,012,820

STABILIZED ORGANO-MERCURI-SULPHUR COMPOUNDS

Morris S. Kharasch, Chicago, Ill., assignor to Eli Lilly and Company, Indianapolis, Ind., a corporation of Indiana No Drawing. Application February 17, 1934, Serial No. 711,822

11 Claims. (Cl. 23—250)

It is the object of my invention to stabilize more effectively than has heretofore been done certain antiseptic and bactericidal alkyl and alicyclic mercuric sulphur compounds, which without such stabilization tend to form dissociation products and thereby both tend to decompose and to lose their effectiveness as antiseptic germicides and tend to develop certain medicinally undesirable properties.

The alkyl and alicyclic mercuric compounds to the stabilization of which my invention is directed are those having the following formula:

(1) 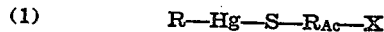    R—Hg—S—R$_{Ac}$—X in which R is an alkyl or alicyclic radical, R$_{Ac}$ is an organic radical containing an acid group which has a free valence bond capable of being attached either to hydrogen to form the corresponding acid or to a metal to form a salt of such acid, both the radical R and the radical R$_{Ac}$ have carbon atoms bonded directly to the mercury atom and to the sulphur atom respectively, and X is hydrogen or an alkali metal or an alkaline-earth metal or ammonium or a substituted ammonium. Such compounds in general form the subject-matter of my Patent No. 1,672,615 granted June 5, 1928; and are effective antiseptics and bactericides, even in very high dilutions.

My present invention is a specific improvement and extension within the scope of the broad claims of my Patent No. 1,862,896, granted June 14, 1932. That Patent No. 1,862,896 is directed broadly to the stabilization of alkyl mercuric sulphur compounds by having co-present with them in solution as an anti-oxidant a water-soluble aliphatic amine, desirably monoethanolamine.

My present invention also employs an amine as an antioxidant and stabilizer, to inhibit the formation of the undesirable dissociation products; but instead of using monoamines as specifically contemplated in my prior Patent No. 1,862,896, it uses aliphatic diamines or substituted aliphatic diamines. These compounds have been found to be much more effective as antioxidants for the purposes above mentioned than are the monoamines. These diamines may or may not be part of the molecular structure of the alkyl mercuric sulphur compounds. That is, the diamines may be either added ingredients initially separate from the alkyl mercuric sulphur compounds, or may be initially part of the alkyl mercuric sulphur compounds. Therefore, when in my claims I state that a diamine is present in the solution, I intend to include both of these situations; because they are in effect essentially the same.

While my present invention, like the generic invention of my prior Patent No. 1,862,896, is directed broadly to the stabilizing of compounds of the general character of Formula (1) above, and of the general character covered by my aforesaid prior patent, I will describe it most specifically in connection with one such compound now in general use. That compound is sodium ethylmercurithiosalicylate, which is known on the market under the trade-mark "Merthiolate" and has the following formula:

(2) 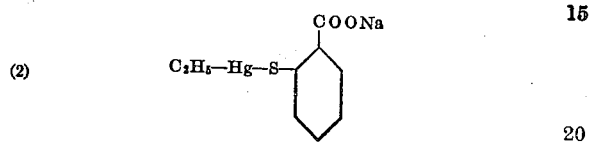

When compounds of the character of Formula (1) are in water solution, it is usually necessary to maintain the hydrogen ion concentration definitely on the alkaline side, conveniently between pH8 and pH10.5; as otherwise in some cases the corresponding acids may precipitate. To this end, it is desirable that the solution have a buffer, such as borax, to preserve its alkalinity. Further, it is usually desirable to make the solution substantially isotonic with the body fluids, as by the addition of an appropriate amount of sodium chloride.

When a water solution of a compound of the character shown in Formula (1) is first made, it is entirely bland, both to the skin and to the mucous membrane. However, in the absence of a stabilizer, it is found that on standing, for different lengths of time for the different compounds, the solution tends to decrease somewhat in effectiveness as an antiseptic and germicide, and to lose its blandness; both of which interfere with its effectiveness as an antiseptic and bactericide. The loss of blandness is apparently a direct function of the oxidation of the material. This loss of blandness, however, may not in itself affect the potency of the material as a germicide. Ordinarily it is not noticeable until the oxidation has proceeded to a considerable extent, say about 50% or more.

I have found that a quantitative measure of deterioration, i. e. oxidation of these substances, is the iodine titre of the solution. This method is much more exact than the qualitative biologic measure. The iodine titration gives a precise answer as to the amount of unaltered material, and may thus be employed in the study and determination of the deterioration of the materials of the type R—Hg—S—R_Ac—X by various chemical agents and by heat and light.

The loss in iodine titre is due to the oxidation of the material, for the products thus formed are not titrated by iodine. This oxidation occurs to an extremely slight extent in the absence of catalysts. However, the co-presence in the solution of almost infinitesimal amounts of metallic ion catalysts, of which copper ion is the most powerful, causes a rapid deterioration (oxidation) of the substance as indicated by a rapid loss of the iodine titre. This deterioration is very marked if the solution contains even as little as one part per million of copper ions, and it is difficult if not impossible to make the solutions of these alkyl and alicyclic mercuric sulphur compounds entirely free from copper. Other catalytic metal ions which tend to cause deterioration, in the order of their effectiveness, are those of manganese, iron, nickel, and cobalt. However, the catalytic effect of the last three metal ions is small compared to that of copper.

I have discovered that the compounds of the type shown in Formula (1) may be stabilized against metallic catalysts, and largely if not wholly prevented from deterioration (oxidation) and the concomitant loss of potency and acquisition of unpleasant properties, by having present in the solutions of these substances a specific antioxidant against metal ion catalysts. The function of the antioxidant against metal ion catalysts in the above system is to combine with the copper, manganese, and/or iron ions and to form stable complexes therewith.

Highly effective antioxidants for this purpose are the aliphatic diamines, and the substituted aliphatic diamines, and especially the 1,2-diamines. In fact, out of over one hundred compounds tested with that objective in mind, the 1,2-aliphatic diamines and substituted 1,2-aliphatic diamines are the only class of substances thus far discovered that is capable of suppressing completely (or substantially completely) in solution the catalytic effect of the metal ions of $Cu^{++}$, $Mn^{++}$, and $Fe^{+++}$ in the system

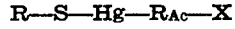

Among the diamines and substituted diamines which are most useful are the following compounds.

a. 1,2-ethylenediamine
b. 1,2-propylenediamine
c. N-phenylethylenediamine (3)
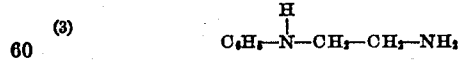

d. 1,2-butylenediamine
e. 1,3-propylenediamine
f. Condensation products of the diamines with aldehydes Of these substances for the stabilization of the mercuric sulphur compounds I prefer 1,2-ethylenediamine and 1,2-propylenediamine. No exact quantity of the stabilizing diamine is necessary; for I have found them effective in amounts varying from as much as 50 molecular equivalents of the alkyl or alicyclic mercuric sulphur compound, to as little as one-half of one molecular equivalent in some instances.

The following is a preferred example of a stabilized solution of an alkyl mercuric sulphur compound.

A solution is made of 10 grams of sodium ethylmercurithiosalicylate in 10 liters of distilled water. To this are added from 1 to 10 grams of ethylenediamine; about 14 grams of borax (to produce and maintain a hydrogen ion concentration above pH8, desirably about pH9.9 to pH10); and about 10 grams of sodium chloride (to make the solution isotonic). The borax serves as a buffer, and is desirable to preserve the alkalinity, although not necessary; and the sodium chloride, although desirable for isotonicity, is not essential.

It is found that this solution, and others of the same general character within the scope of the present description and claims, may be preserved for long periods, with relatively little and often no deterioration in potency as indicated by the iodine titre, with no loss as an antiseptic and bactericide, and with no acquisition of undesirable qualities; even when the temperature is allowed to rise to 60° C. for a long period of time.

The following example shows the comparative results with sodium ethylmercurithiosalicylate ("Merthiolate") containing monoethanolamine and ethylenediamine respectively in the presence of copper as the catalyst:

*Example.*—Two test solutions were made. Each solution contained 1 gram of sodium ethylmercurithiosalicylate, 1.4 grams of borax, and 1 gram of sodium chloride, in a liter of water. One of the solutions also contained 1 gram of monoethanolamine, the preferred antioxidant of my prior Patent No. 1,862,896; and the other contained 1 gram of ethylenediamine, the preferred antioxidant of the present invention. Each of these two solutions was divided into two equal parts; and to one of said parts, of each of the two solutions, copper sulphate was added in an amount to give one part of copper ions per million. Oxygen was bubbled through each of the four solutions; which were then put in separate tubes, and the tubes were sealed and heated to 60° C. and maintained at that temperature for five days.

Then a 5 cc. sample of each of the four solutions was titrated with 0.00545N iodine solution. The following results were obtained:

a. The titre of the solution which contained monoethanolamine but was without copper ions, had dropped from 4.44 cc. of iodine solution to 4.11 cc.

b. The titre of the solution which contained monethanolamine and to which one part of copper ions per million had been added, had dropped from 4.21 cc. to 2.96 cc.

c. The titre of the solution which contained ethylenediamine without copper ions, had changed from 4.20 cc. to 4.22 cc., which is substantially no change.

d. The titre of the solution which contained ethylenediamine and to which one part of copper ions per million had been added, changed from 4.25 cc. to 4.35 cc., which is also substantially no change.

e. The effect of copper on a sample solution of sodium ethylmercurithiosalicylate, but containing neither monoethanolamine nor ethylenediamine is shown by the following control tests. A 5 cc. sample of such a solution prepared as described above and containing one part of copper ions per million of the solution was heated for 18 hours at 60° C. The titre of this solution dropped from an original titre of 4.65 cc. of 0.00545N iodine solution 1.61 cc. When the heating was continued for 13 days, the titre dropped to 0.22 cc. of iodine solution.

Thus, although monoethanolamine, as set forth in my prior Patent No. 1,862,896, has a beneficial effect as an anti-oxidant, the inhibitory effect of an aliphatic diamine, such as ethylenediamine, is many times greater, if not substantially complete, in inhibiting the catalytic action of copper.

In the tests above, the amount of ethylenediamine used was equal to that of the sodium ethylmercurithiosalicylate. However, the amount of ethylenediamine may be reduced; for if it is present in only one-tenth the amount of the sodium ethylmercurithiosalicylate the drop in the titre of the solution from an original value of 4.16 cc. of 0.00545N iodine solution is only to 3.91 cc. after two weeks heating at 60° C. in an atmosphere of oxygen.

In the stabilization of sodium ethylmercurithiosalicylate by ethylenediamine as above discussed, the ethylenediamine was not initially part of the molecule of the compound being stabilized. However, it may be a part of the molecule with some compounds, by forming the basic part thereof as a substituted ammonium.

Thus any of the acids of my aforesaid Patent No. 1,672,615 may be caused to react with ethylenediamine. This forms the ethylenediamine salt of such acid—a new type of salt, which is not susceptible to oxidation by oxygen even in the presence of metal-ion catalysts, such as those of copper, manganese, and iron—a unique property among salts of thio compounds. The formula of ethylenediamine ethylmercurithiosalicylate is probably either (4) 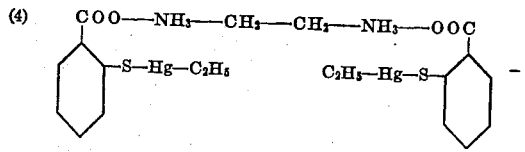

or (5) 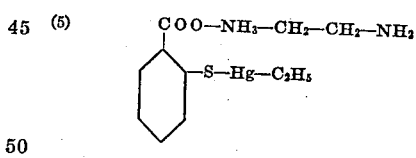

I have found that diamine salts of this type are substantially stable in water solution—by what may be termed internal stabilization to distinguish from the external stabilization produced when the diamine does not initially form part of the molecule.

While I am not certain what the precise nature is of the action of the aliphatic diamines as antioxidants against the effects of metal ions in the above systems, my theory of such action is briefly as follows:

In water solution the alkyl-mercuric sulphur compounds tend to dissociate in part, by separation between the mercury and sulphur atoms of Formulas 1 and 2. The resultant sulfhydryl groups are oxidized (by the oxygen of the air) to di-sulphide compounds of the following type, which I will call Product 6:

(6) 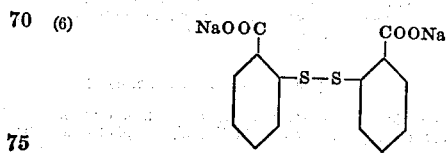

It is this oxidation of the sulfhydryl groups that is catalyzed tremendously by metal ions.

The organo-mercury ions are then in excess as compared with sulfhydryl ions; and some of them then combine with hydroxyl ions in solution to give a substance of the following type, which I will call Product 7.

(7) $C_2H_5$—Hg—OH

Since the formation of Product 6 is catalyzed tremendously by the ions of copper, manganese, and iron, the effect of the ethylenediamine and similar diamines is due to their ability to form extremely stable complexes with these metal ions and thus remove them effectively from the system. This in turn prevents the reaction from yielding products of Types 6 and 7, and thereby serves to prevent the progressive breakdown of the alkyl mercuric sulphur compounds. An effect is produced which is commonly called "stabilization". The stable complexes above referred to are formed whether the diamine for forming them comes from free diamine in solution or from diamine which forms part of the salt molecule.

In the foregoing I have used sodium ethylmercurithiosalicylate simply as an example. The aliphatic diamines, such as ethylenediamine, exercise similar stabilizing effects on the other alkyl and alicyclic mercuric sulphur compounds of the type described in my Patent No. 1,672,615. Among the other compounds which can be thus stabilized in water solution are:

1. Sodium methylmercurithiosalicylate;
2. Potassium methylmercurithiosalicylate;
3. Ammonium methylmercurithiosalicylate;
4. Potassium ethylmercurithiosalicylate;
5. Ammonium ethylmercurithiosalicylate;
6. Ethylmercuri-p-thiobenzenesulfonic acid; and its alkali-metal and ammonium salts;
7. Sodium ethylmercuri-m-thiobenzoate;
8. Sodium cyclohexylmercurithiosalicylate;
9. Sodium ethylmercurithioglycollate;
10. Sodium benzylmercuri-p-thiobenzoate;
11. Sodium 4-methylcyclohexylmercuri-$\beta$-thiopropionate;
12. Instead of using sodium, potassium, or ammonium as the base to form salts of the abovementioned mercuri-thio acids of Formula 1, the diamine may be used as the base, as already explained, to obtain salts of this type:

(8) 

(9) 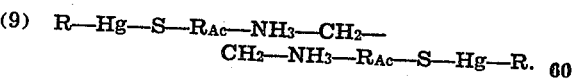

In this case ethylenediamine is used as an example of a diamine base, but other diamines may be used. These diamine salts are produced by the addition of the diamine in ether or alcohol to an ether or alcohol solution of the mercuri-thio acid of Formula 1. It is also possible, of course, and usually more advantageous, to prepare these salts in water solution by adding the diamine to a suspension of the acid, and adjusting the hydrogen ion concentration of the solution to any desired value, or by directly dissolving the acid in a water solution of the diamine. These diamine salts are inherently stable in solution.

I have not attempted to list all the soluble salts and acids for which the diamines are effective as stabilizers, but they are in general those set forth in my aforesaid prior Patent No. 1,672,615.

While I have described at length only the effect of ethylenediamine in suppressing the oxidation of sulfhydryl compounds induced in some systems by copper and other metal ions, the diamines may be used equally to stabilize other systems where those metal ions play a catalytic role. The generic aspect of this is the subject-matter of my co-pending application Serial No. 725,482, filed May 14, 1934.

Furthermore, as has been stated, and as is clear from Table I below, other diamines than ethylenediamine are distinctly beneficial in preventing oxidation induced by metal catalysts, such as iron, manganese, and copper. In all the tests of Table I, 5 cc. of the mercurial solution was employed (usually about 1:1000 solution), and the iodine solution was so diluted that it took about the same amount of it. The results are therefore comparable, and a decrease in iodine titre indicates deterioration. The hydrogen ion concentration of all solutions tested was pH9.2 to pH9.3. The accuracy of the iodine titrations is ±0.2 cc.

TABLE I

*Effect of metal catalyst on the rate of oxidation of compounds R—Hg—S—R$_{Ac}$—X, and the elimination of that effect by diamines*

| Name | Catalyst added and amount | Initial iodine titration | Diamine added in grams per gram of mercurial | Iodine titre after heating at 60° in oxygen for a period of— | Remarks |
|---|---|---|---|---|---|
| (1) Sodium ethylmercurithiosalicylate ("Merthiolate")+monoethanolamine. | None | 5.04 | | 4 days 4.89 | Since the accuracy of the readings is ±0.2 cc. of iodine, "Merthiolate" without copper keeps perfectly. |
| (2) Sodium ethylmercurithiosalicylate+monoethanolamine. | Cu$^{++}$ (1:1,000,000) | 4.11 | | 4 days 1.23 | Shows deterioration. |
| (3) Sodium ethylmercurithiosalicylate+monoethanolamine. | Mn$^{++}$ (1:1,000,000) | 5.34 | | 3 days 3.48 | Mn is less effective than Cu in causing deterioration. |
| (4) Sodium ethylmercurithiosalicylate+monoethanolamine. | Fe$^{+++}$ (1:1,000,000) | 5.16 | | 2 days 4.80 | Fe is definitely less effective catalytically than copper. |
| (5) Sodium ethylmercurithiosalicylate+monoethanolamine. | Cu$^{++}$ (1:1,000,000) | 4.25 | Ethylenediamine (1.0 g.) | 8 days 4.29 | No change—Complete inhibition of copper catalysis. |
| (6) Ethylenediamine ethylmercurithiosalicylate.[1] | Cu$^{++}$ (1:50,000) | 4.22 | | 25 days 4.08 | Complete inhibition of such huge catalytic amounts of copper. |
| (7) Ethylenediamine ethylmercurithiosalicylate.[1] | Fe$^{+++}$ (1:100,000) | 4.33 | | 8 days 4.20 | Complete inhibition of catalytic effect of iron. Formation of a precipitate of ferric hydroxide. |
| (8) Ethylenediamine ethylmercurithiosalicylate.[1] | Mn$^{++}$ (1:100,000) | 4.18 | | 6 days 4.06 | Complete inhibition of catalytic effect of manganese. |
| (9) Sodium ethylmercurithiosalicylate+monoethanolamine. | Cu$^{++}$ (1:50,000) | 3.93 | Ethylenediamine (0.3 g.) | 16 days 3.79 | The 0.03% concentration of the diamine is sufficient to protect the material against copper catalysis. |
| (10) Sodium ethylmercurithiosalicylate+monoethanolamine. | Cu$^{++}$ (1:50,000) | 4.75 | Propylenediamine (0.4 g.) | 10 days 4.62 | Propylenediamine is almost as effective as ethylenediamine against copper catalysis. |
| (11) Sodium ethylmercurithiosalicylate+monoethanolamine. | Mn$^{++}$ (1:100,000) | 5.22 | Propylenediamine (0.3 g.) | 11 days 5.28 | Equally effective as ethylenediamine against Mn catalysis. |
| (12) Sodium ethylmercurithiosalicylate+monoethanolamine. | Cu$^{++}$ (1:200,000) | 5.35 | N-phenylethylenediamine (0.3 g.) | 12 days 3.75 | Much inferior to the aliphatic diamines, but still much superior to sample not containing the diamine (Cf. Example #2). |
| (13) Sodium cyclohexylmercuri-β-thiopropionate. | Cu$^{++}$ (1:100,000) | 4.39 | | 2 days 1.82 | Rapid deterioration. pH was maintained at 9.2 by use of borax. |
| (14) Sodium cyclohexylmercuri-β-thiopropionate. | Cu$^{++}$ (1:100,000) | 4.53 | Ethylenediamine (0.4 g.) | 8 days 4.38 | Excellent protection. |
| (15) Sodium methylmercurithioglycollate. | Cu$^{++}$ (1:1,000,000) | 4.35 | | 2 days 0.8 | Complete deterioration without a protecting agent. |
| (16) Ethylenediamine methylmercurithioglycollate.[2] | Cu$^{++}$ (1:1,000,000) | 4.23 | | 5 days 3.89 | Excellent protection of such an extremely readily oxidized system. (Cf. #15 above.) |
| (17) Ethylenediamine methylmercuri-p-thiobenzene-sulfonate.[3] | Cu$^{++}$ (1:50,000) | 4.85 | | 20 days 4.76 | Excellent protection. Same results were obtained with other catalytic metals and when ethylenediamine (0.4 g.) was added to a 1-gram sample of the corresponding sodium salt in 1000 cc. of water. |
| (18) Sodium butylmercurithiosalicylate. | Cu$^{++}$ (1:100,000) | 3.92 | | 2 days 1.0 | Rapid deterioration. |
| (19) Sodium butylmercurithiosalicylate. | Cu$^{++}$ (1:100,000) | 4.10 | Propylenediamine (0.4 g.) | 13 days 3.89 | Excellent protection against catalytic effect of copper which accelerates oxidation by oxygen. |

[1] Prepared by adding ethylenediamine to a water suspension of ethylmercurithiosalicylic acid, and adjusting the pH to neutrality or any desired alkalinity.
[2] Prepared by adding ethylenediamine to a water suspension of methylmercurithioglycollic acid, and adjusting the pH to the desired value.
[3] Prepared by adding ethylenediamine to a water solution of methylmercuri-p-thiobenzene-sulphonic acid and adjusting the pH to the desired value.

I claim as my invention:

1. A stabilized solution of an alkyl mercuric sulphur compound, in which one bond of the mercury atom is attached to a carbon atom of an alkyl radical, the other bond of the mercury atom is attached to one bond of the sulphur atom, and the other bond of the sulphur atom is attached to a carbon atom of an organic radical containing an acid group which has a valence bond attached to hydrogen or an alkali or alkaline-earth metal or ammonium or a substituted ammonium; which solution contains a water-soluble aliphatic 1,2-diamine.

2. A stabilized solution of an alkyl mercuric sulphur compound, in which one bond of the mercury atom is attached to a carbon atom of an alkyl radical, the other bond of the mercury atom is attached to one bond of the sulphur atom, and the other bond of the sulphur atom is attached to a carbon atom of an organic radical containing an acid group which has a valence bond attached to hydrogen or an alkali or alkaline-earth metal or ammonium or a substituted ammonium; which solution contains ethylenediamine.

3. A stabilized solution of an alkyl mercuric sulphur compound, in which one bond of the mercury atom is attached to a carbon atom of an alkyl radical, the other band of the mercury atom is attached to one bond of the sulphur atom, and the other bond of the sulphur atom is attached to a carbon atom of an organic radical containing an acid group which has a valence bond attached to hydrogen or an alkali or alkaline-earth metal or ammonium or a substituted ammonium; which solution contains propylenediamine.

4. A water solution containing sodium ethylmercurithiosalicylate and a water-soluble aliphatic 1,2-diamine.

5. A water solution containing sodium ethylmercurithiosalicylate and ethylenediamine.

6. A water solution containing sodium ethylmercurithiosalicylate and propylenediamine.

7. A salt formed by the reaction of an aliphatic 1,2-diamine with an acid of the type

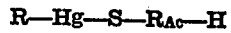

in which R is an alkyl or alicyclic radical, $R_{Ac}$ is an organic radical containing an acid group which has a free valence bond capable of being attached either to hydrogen to form the corresponding acid or to a metal to form a salt of such acid, and both the radical R and the radical $R_{Ac}$ have carbon atoms bonded directly to the mercury atom and to the sulphur atom respectively.

8. A salt formed by the reaction of ethylenediamine with an acid of the type

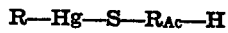

in which R is an alkyl or alicyclic radical, $R_{Ac}$ is an organic radical containing an acid group which has a free valence bond capable of being attached either to hydrogen to form the corresponding acid or to a metal to form a salt of such acid, and both the radical R and the radical $R_{Ac}$ have carbon atoms bonded directly to the mercury atom and to the sulphur atom respectively.

9. A salt formed by the reaction of propylenediamine with an acid of the type

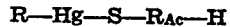

in which R is an alkyl or alicyclic radical, $R_{Ac}$ is an organic radical containing an acid group which has a free valence bond capable of being attached either to hydrogen to form the corresponding acid or to a metal to form a salt of such acid, and both the radical R and the radical $R_{Ac}$ have carbon atoms bonded directly to the mercury atom and to the sulphur atom respectively.

10. Ethylenediamine ethylmercurithiosalicylate.

11. Propylenediamine ethylmercurithiosalicylate.

MORRIS S. KHARASCH.

CERTIFICATE OF CORRECTION.

Patent No. 2,012,820.      August 27, 1935.

MORRIS S. KHARASCH.

It is hereby certified that error appears in the printed specification of the above numbered patent requiring correction as follows: Page 2, second column, line 54, for "monethanolamine" read monoethanolamine; line 68, insert a comma after "ethylenediamine"; and line 75, after the syllable "lution" insert the word to; and that the said Letters Patent should be read with these corrections therein that the same may conform to the record of the case in the Patent Office.

Signed and sealed this 8th day of October, A. D. 1935.

Leslie Frazer

Acting Commissioner of Patents.

(Seal)

CERTIFICATE OF CORRECTION.

Patent No. 2,012,820.                                   August 27, 1935.

MORRIS S. KHARASCH.

It is hereby certified that error appears in the printed specification of the above numbered patent requiring correction as follows: Page 2, second column, line 54, for "monethanolamine" read monoethanolamine; line 68, insert a comma after "ethylenediamine"; and line 75, after the syllable "lution" insert the word to; and that the said Letters Patent should be read with these corrections therein that the same may conform to the record of the case in the Patent Office.

Signed and sealed this 8th day of October, A. D. 1935.

Leslie Frazer (Seal)                                        Acting Commissioner of Patents.